US008551644B2

(12) United States Patent
Liu

(10) Patent No.: US 8,551,644 B2
(45) Date of Patent: Oct. 8, 2013

(54) FIXING MECHANISM AND ELECTRONIC DEVICE USING THE SAME

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 488 days.

(21) Appl. No.: 12/911,003

(22) Filed: Oct. 25, 2010

(65) Prior Publication Data

US 2011/0183175 A1    Jul. 28, 2011

(30) Foreign Application Priority Data

Jan. 23, 2010   (CN) .......................... 2010 1 0300628

(51) Int. Cl.
*H01M 2/04* (2006.01)
(52) U.S. Cl.
USPC ........................................................ 429/175

(58) Field of Classification Search
None
See application file for complete search history.

(56) References Cited

FOREIGN PATENT DOCUMENTS

CN         2643563 Y      9/2004
CN         201004200 Y    1/2008

*Primary Examiner* — Patrick Ryan
*Assistant Examiner* — Wyatt McConnell
(74) *Attorney, Agent, or Firm* — Altis & Wispro Law Group, Inc.

(57) ABSTRACT

An electronic device includes a fixing mechanism for a battery that includes a housing, a guide track positioned on the housing, a latching member slidably received in the guide track, a resilient member, a control, and a resisting member. The battery includes a latching slot. The latching member includes a latching end latching with the latching slot. The control resists the latching member to drive the latching member along the guide track. Two ends of the resisting member resist the latching member and the extended surface. The latching member is capable of sliding away from the battery to detach the latching end from the latching slot and elevate the battery.

16 Claims, 6 Drawing Sheets

FIXING MECHANISM AND ELECTRONIC DEVICE USING THE SAME

BACKGROUND

1. Technical Field

The present disclosure relates to device fixing, and particularly, to a battery fixing mechanism for an electronic device and an electronic device utilizing the mechanism.

2. Description of Related Art

Electronic devices, such as personal digital assistants (PDA), MP3 players, digital photo frames are often powered by batteries. A battery fixing mechanism is often used to fix the batteries within the electronic devices.

A frequently used battery fixing mechanism has a housing defining a receiving groove, an elastic member fixed in the receiving groove, and a latching member. The battery is securely received in the receiving groove by the latching member. The elastic member resists the battery, such that electrodes of the battery and the electronic device make effective contact.

However, because the receiving groove is narrow and the pressure provided by the elastic member on the battery is large, a small tool or other aiding device is required to withdraw the battery from the battery fixing mechanism, inconveniencing removal and replacement of the battery.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
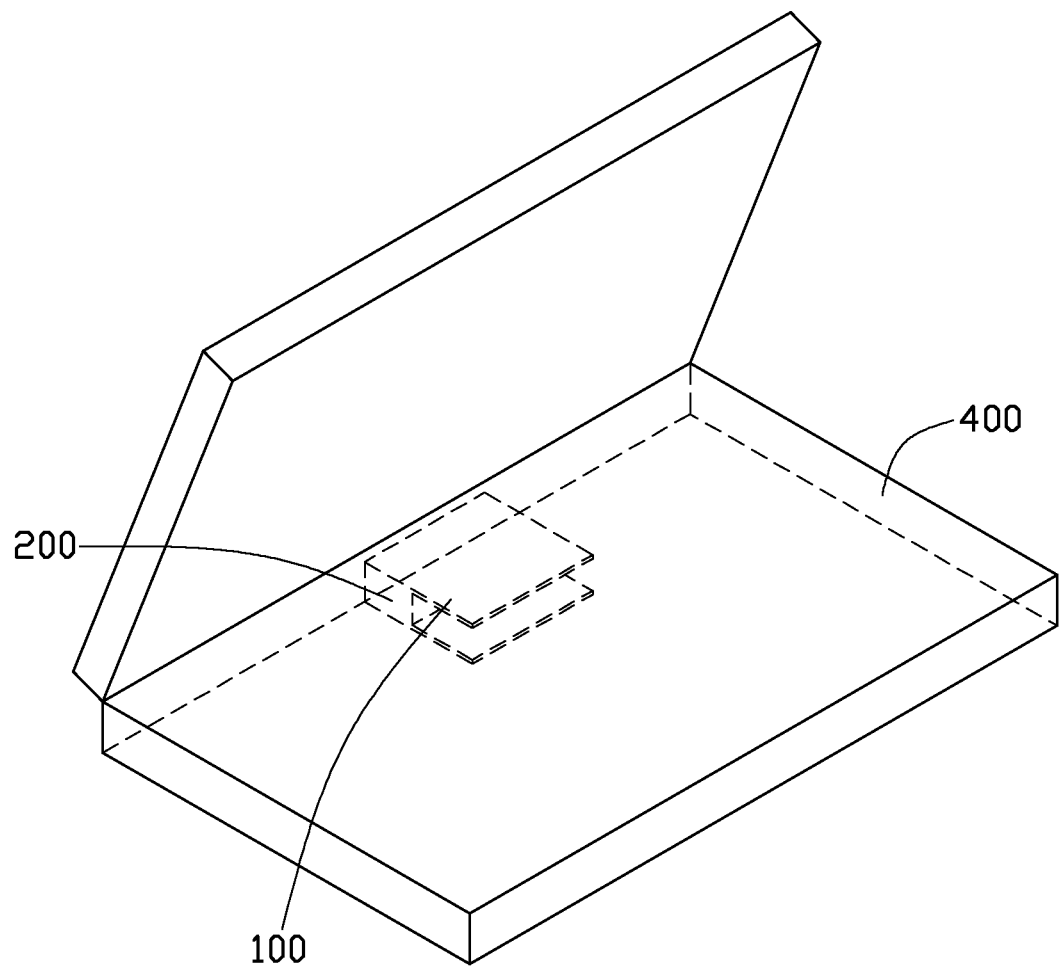
FIG. 1 is an assembled, isometric view of one embodiment of an electronic device, including an embodiment of a fixing mechanism and a battery.

Referring to FIG. 1, an embodiment of an electronic device 400 includes an embodiment of a fixing mechanism 100 and a battery 200 fixed in the electronic device 400 by the fixing mechanism 100. The electronic device 400 may be, for example, a notebook computer, a music player, a camera, a digital video player. In the illustrated embodiment, the electronic device 400 is a notebook computer.

Figure 2:
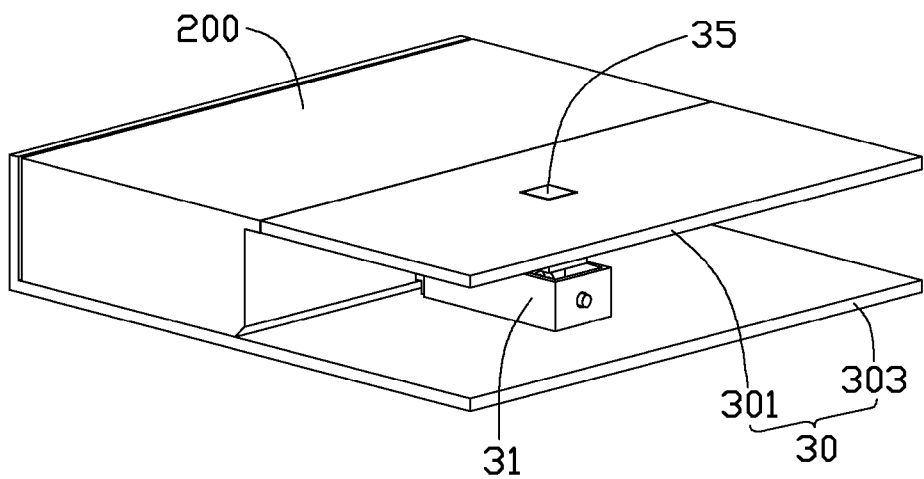
FIG. 2 is an assembled, isometric view of the fixing mechanism and battery of FIG. 1.
Figure 3:
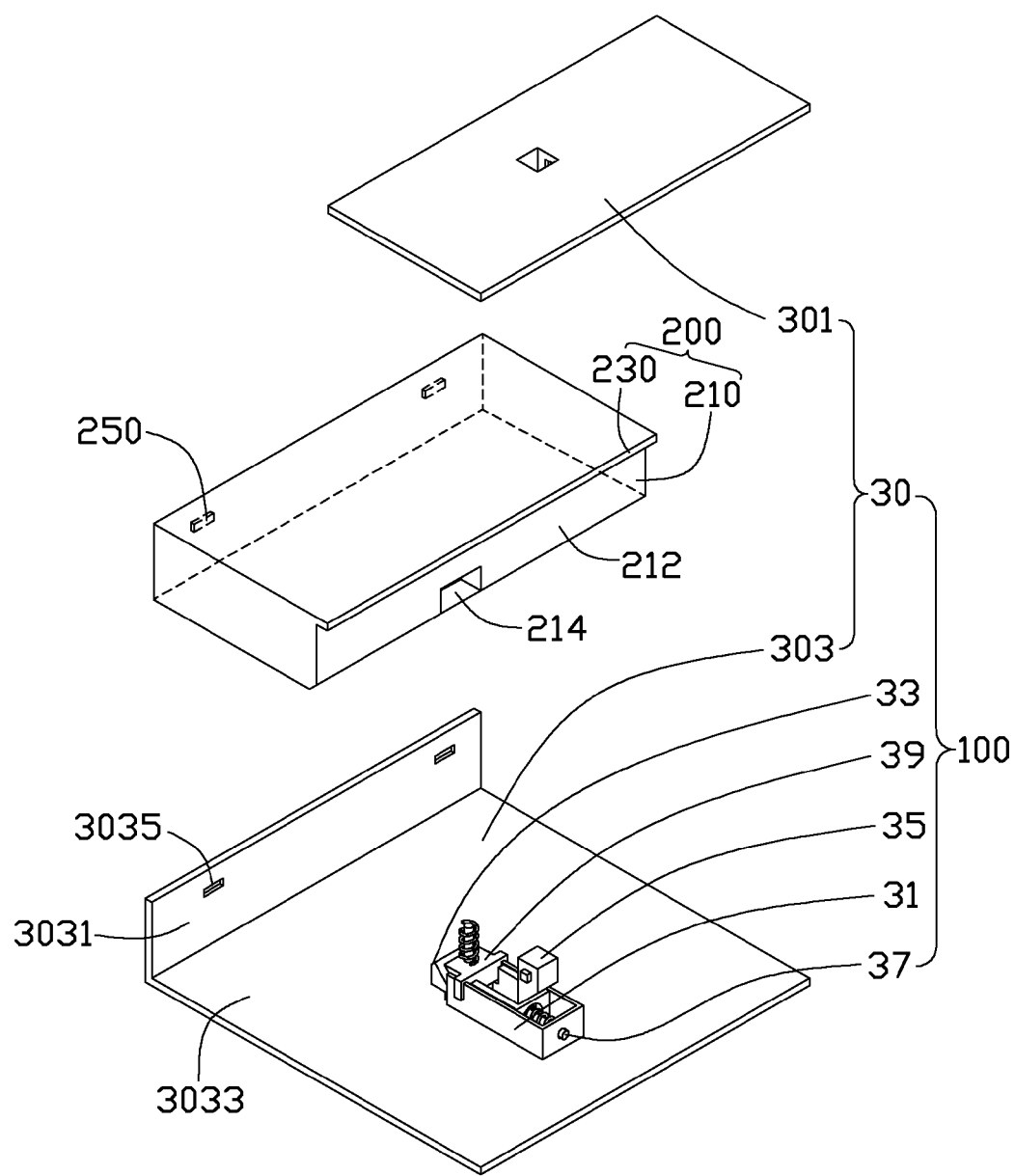
FIG. 3 is an exploded, isometric view of the fixing mechanism and the battery of FIG. 2.

Referring to FIG. 2 and FIG. 3, the battery 200 includes a main body 210 and an extended surface 230. The main body 210 is substantially a rectangular block and includes a side surface 212. The main body 210 defines a latching slot 214 in the side surface 212. The extended surface 230 is substantially a rectangular board positioned on the main body 210 substantially perpendicular to the side surface 212. The main body 210 further includes a pair of protrusions 250 protruding from a side surface of the main body 210 opposite to the side surface 212.

The battery fixing device 100 includes a housing 30, a guide track 31, a latching member 33, a control 35, a resilient assembly 37, and a resisting member 39.

Figure 4:
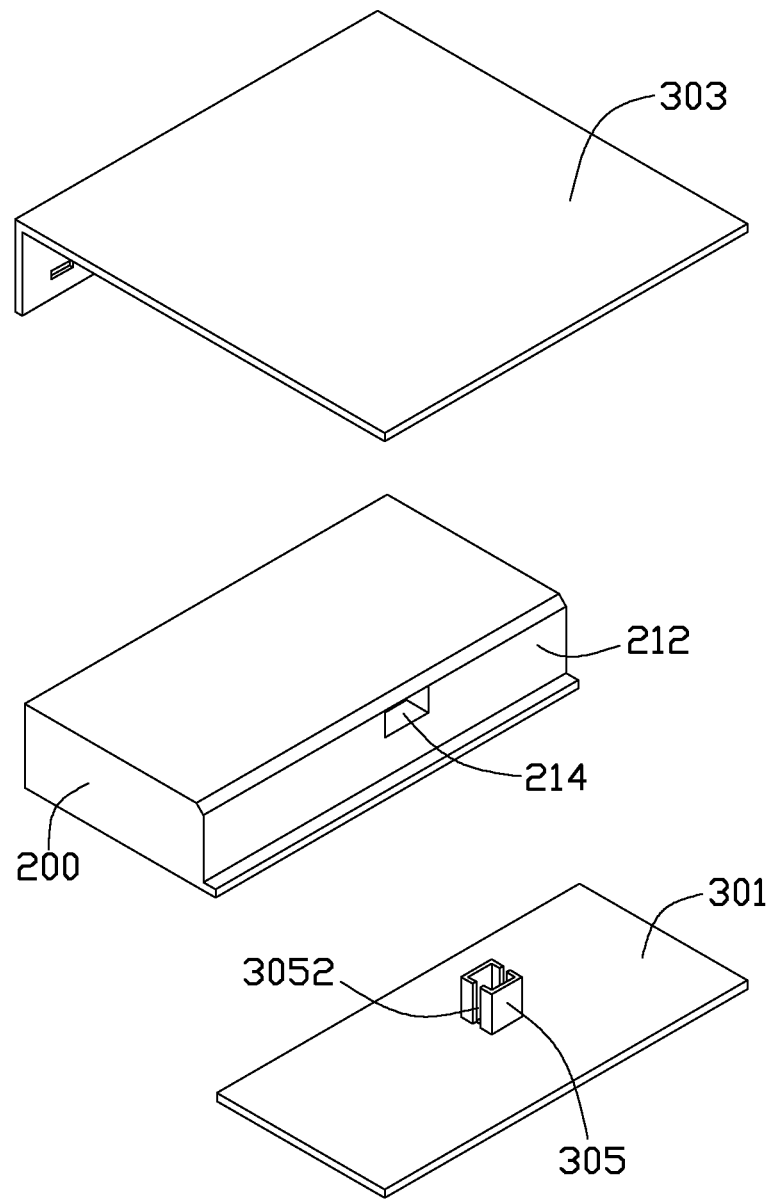
FIG. 4 is similar to FIG. 3, but viewed from another aspect.
Figure 5:
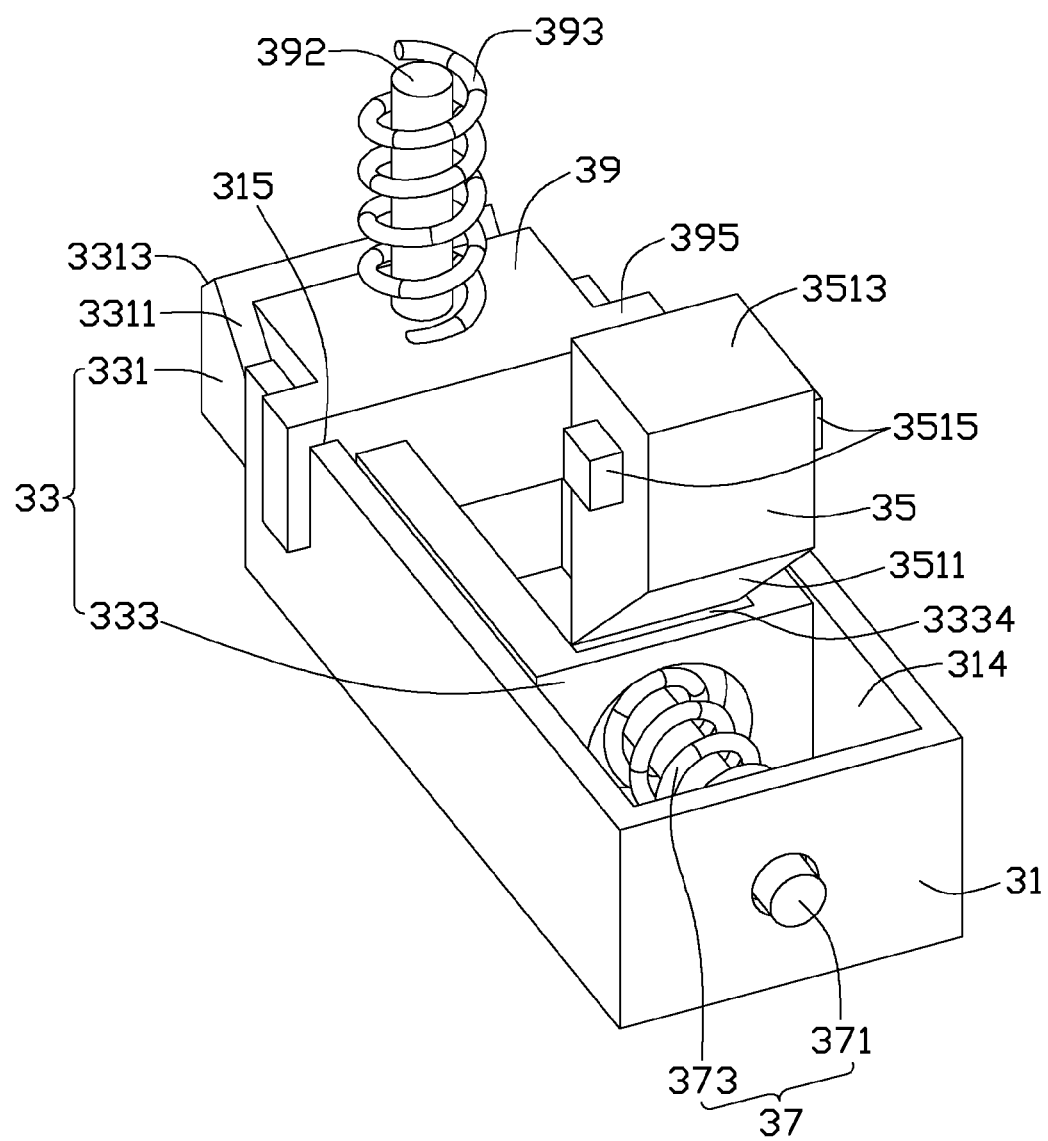
FIG. 5 is an enlarged, partially assembled, isometric view of the fixing mechanism of FIG. 2.
Figure 6:
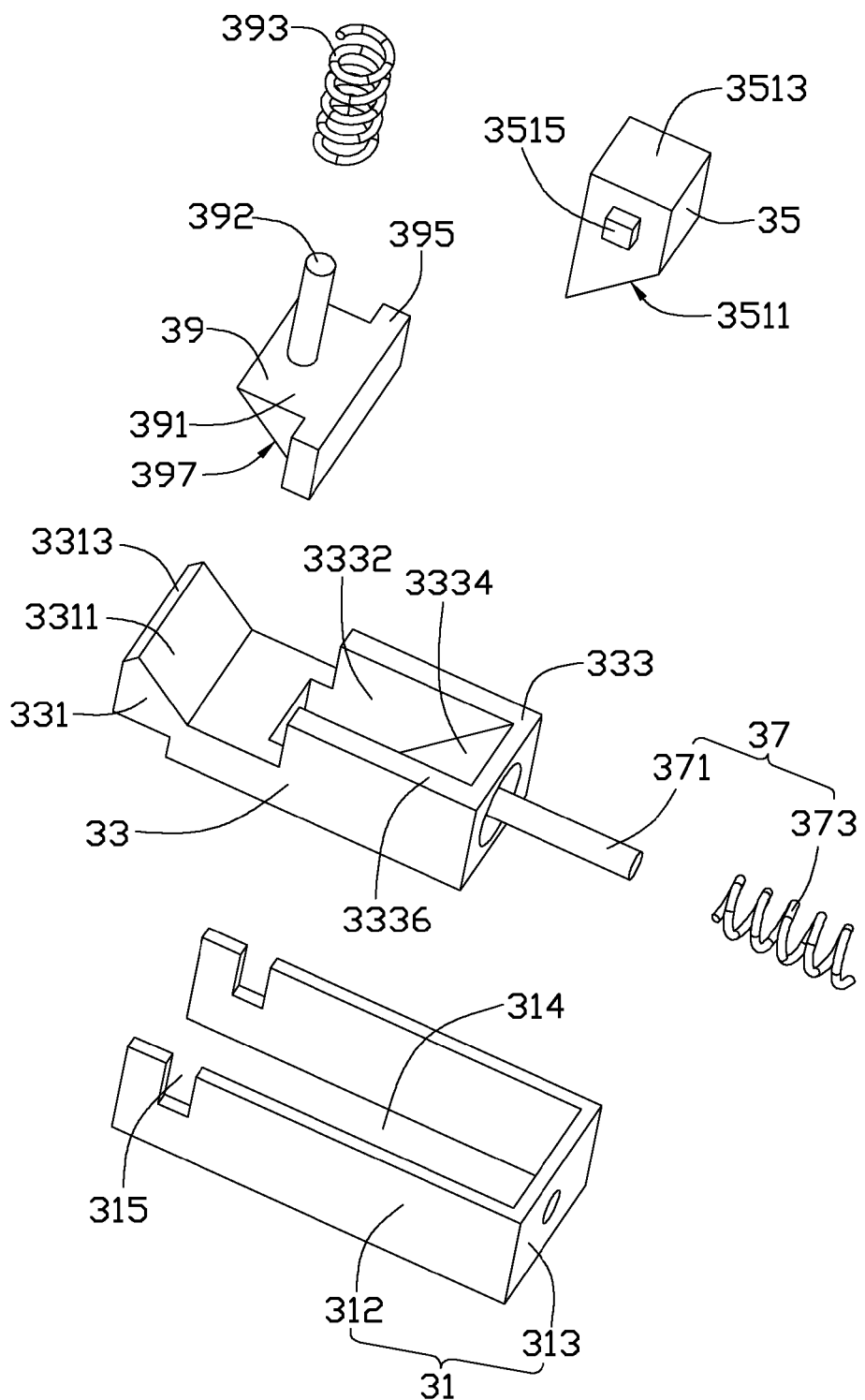
FIG. 6 is a partially exploded, isometric view of the fixing mechanism of FIG. 2.

Referring to FIGS. 3 and 4 together, the housing 30 is received in the electronic device 400, and includes a cover 301, a base 303, and a control housing 305. The cover 301 is substantially a rectangular board, and fixed in the electronic device 400. The base 303 includes a baseboard 3033 substantially parallel to the cover 301 and a sideboard 3031 extending from an edge of the baseboard 3033. The sideboard 3031 defines two recesses 3035 on an inner surface of the sideboard 3031 and correspond to the two protrusions 250 of the battery 200. The control housing 305 is positioned at the center of an inner surface of the cover 301, and extends from the cover 301 to the baseboard 3033. The control housing 305 defines two opposite guide slots 3052 extending toward the cover 301.

Referring to FIG. 3 through FIG. 6, the guide track 31 is positioned at an inner surface of the baseboard 303 corresponding to the middle of the sideboard 3031. The guide track 31 includes a first board 313 substantially parallel to the sideboard 3031 and a pair of second boards 312. The second boards 312 extend from two opposite ends of the first board 313. The first board 313 and the second boards 312 cooperatively define a sliding slot 314. Each second board 312 defines a fixing slot 315 substantially perpendicular to the baseboard 3033. The fixing slots 315 communicate with the sliding slot 314.

The latching member 33 is partially received in the sliding slot 314. The latching member 33 includes a latching end 331 and a blocking end 333 connecting the latching end 331. The blocking end 333 is received in the sliding slot 314. The latching end 331 includes a first angled face 3311 angled to the baseboard 3033. The first angled face 3311 defines an acute angle relative to the baseboard 3033. The latching end 331 further includes a chamfer 3313 at the first angled face 3311 away from the blocking end 333. The blocking end 333 includes a second angled face 3334 and a pair of sidewalls 3336. The sidewalls 3336 are spaced apart and substantially parallel to each other. The second angled face 3334 extends away from the first angled face 3311. Two opposite edges of the second angled face 3334 adjoin the sidewalls 3336. The second angled face 3334 and the sidewalls 3336 cooperatively define a receiving groove 3332.

The control 35 is substantially a rectangular block slidably received in the control housing 305. The control 35 includes a resisting slope 3511 facing the second angled face 3334, a contact surface 3513 opposite to the resisting slope 3511 and away from the latching member 33, and a pair of guide protrusions 3515. The guide protrusions 3515 extend from two opposite sides of the control 35 and are received in the corresponding guide slots 3052. The resisting slope 3511 corresponds to the second angled face 3334.

The resilient assembly 37 includes a guide member 371 and a resilient member 373. The guide member 371 is a cylindrical rod, and extends substantially parallel to the second boards 312. In the illustrated embodiment, the guide member 371 is fixed to an end of the blocking end 333 adjacent to the first board 313. It should be pointed out that the guide member 371 may be fixed to the first board 313 in an alternative embodiment. The resilient member 373 is a spring sleeved on the guide member 371. Two opposite ends of the resilient member 373 abut the blocking end 333 and the first board 313 respectively.

The resisting member 39 is partially received in the sliding slot 314, and positioned at an end of the blocking end 333 adjacent to the latching end 331. The resisting member 39 includes a fixing surface 391, a pushing rod 392, a spring 393, a pair of protrusions 395, and a third angled face 397 angled to the fixing surface 391. The fixing surface 391 is substantially parallel to the cover 301 and faces the inner surface of the cover 301. The pushing rod 392 extends from the fixing surface 391 towards the cover 301. The spring 393 is sleeved on the pushing rod 392, and two opposite ends of the spring 393 abut the fixing surface 391 and the cover 301 respectively. The protrusions 395 are slidably received in the fixing slots 315. The third angled surface 397 faces and corresponds to the first angled face 3311.

During installation, the two protrusions 250 of the battery 200 are received in the corresponding recesses 3035, and each protrusion 250 is partially received in the corresponding recess 3035. An external force impels the battery 200 to resist the chamfer 3313 of the latching member 33, such that the latching member 33 slides along the sliding slot 314 toward the first board 313 and compresses the resilient member 373 until the battery 200 is fixed on the baseboard 3033. Finally the latching end 331 is received in the latching slot 214.

During removal of the battery 200, external force on the contact surface 3513 of the control 35 impels the resisting slope 3511 to resist the second angled face 3334 and drive the latching member 33 away from the battery 200 to compress the resilient member 373. As the latching member 33 slides further, the latching end 331 slides out of the latching slot 214 of the battery 200, and the first angled face 3311 resists the third angled face 397 of the resisting member 39 to drive the resisting member 39 upward along the fixing slot 315, such that the pushing rod 392 of the resisting member 39 pushes the extended surface 230 of the battery 200 upward and elevates the battery 200. The battery 200 is then easily disassembled from the fixing mechanism 100. After removal, the first resilient member 373 is restored to its original condition and returns the latching member 33 to its original position.

It is to be understood that the guide protrusions 3515 and the guide slots 3052 may be omitted. The guide member 371 may be omitted as long as an end of the resilient member 373 is fixed to the blocking end 333 directly.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A fixing mechanism for a battery, the battery defining a latching slot, the mechanism comprising:
   a housing to receive the battery, the housing comprising a cover and a base, the base comprising a baseboard substantially parallel to the cover and a sideboard extending from an edge of the baseboard;
   a guide track positioned at an inner surface of the baseboard;
   a latching member slidably received in the guide track, comprising a latching end received in the latching slot;
   a resilient member, two ends of which resist the guide track and the latching member;
   a control resisting the latching member to drive the latching member along the guide track;
   a resisting member resisting the latching member and the battery; and
   a guide member extending substantially perpendicular to the sideboard on which the resilient member is sleeved, wherein the guide track defines a sliding slot substantially parallel to the baseboard and substantially perpendicular to the sideboard, and the latching member is capable of sliding away from the battery to detach the latching end from the latching slot and elevate the battery via the resisting member.

2. The fixing mechanism of claim 1, wherein an end of the guide member is fixed to the guide track.

3. The fixing mechanism of claim 1, wherein an end of the guide member is fixed to the latching member.

4. The fixing mechanism of claim 1, wherein the housing further comprises a control housing positioned at the cover and extending substantially perpendicular from the cover to the baseboard, wherein the control is slidably received in the control housing.

5. The fixing mechanism of claim 4, wherein the control housing defines at least one guide slot extending substantially perpendicular to the baseboard, and the control comprises at least one guiding protrusion received in the corresponding guide slot.

6. The fixing mechanism of claim 1, wherein the latching member further comprises a blocking end connecting the latching end, the resilient member resists the blocking end, and the blocking end of the latching member and the resilient member are received in the sliding slot.

7. The fixing mechanism of claim 6, wherein the latching end of the latching member comprises a first angled face angled relative to the baseboard, and the resisting member comprises a third angled face facing and matching the first angled face.

8. The fixing mechanism of claim 7, wherein the blocking end comprises a second angled face angled relative to the baseboard, the control comprises a resisting slope matching the second angled face.

9. The fixing mechanism of claim 7, wherein the latching end of the latching member further comprises a chamfer at the first angled face away from the blocking end.

10. The fixing mechanism of claim 1, wherein the guide track comprises a first board and a pair of second boards, the first board and the pair of second boards cooperatively define the guide slot, each second board defines a fixing slot extending substantially perpendicular to the baseboard and communicate with the sliding slot, and the resisting member comprises two protrusions slidably received in the two fixing slots.

11. An electronic device, comprising:
    a battery defining a latching slot; and
    a fixing mechanism received in the electronic device to fix the battery to the electronic device, comprising:
    a housing to receive the battery, the housing comprising a cover and a base, the base comprising a baseboard substantially parallel to the cover and a sideboard extending from an edge of the baseboard;
    a guide track positioned at an inner surface of the baseboard;
    a latching member slidably received in the guide track, the latching member comprising a latching end latching with the latching slot;
    a resilient member, two ends of the resilient member resisting the guide track and the latching member;
    a control resisting the latching member to drive the latching member to slide along the guide track;
    a resisting member resisting the latching member and the battery; and
    a guide member, wherein the guide track defines a sliding slot extending substantially parallel to the baseboard, the guide member extends substantially parallel to the baseboard and substantially perpendicular to the sideboard, the resilient member is sleeved on the guide member, and the latching member is capable of sliding away from the battery to detach the latching end from the latching slot and elevate the battery via the resisting member.

12. The fixing mechanism of claim 11, wherein the housing further comprises a control housing positioned at the cover and extending substantially perpendicular from the cover to the baseboard, the control being slidably received in the control housing.

13. The fixing mechanism of claim 12, wherein the control housing defines at least one guide slot extending substantially perpendicular to the baseboard, and the control comprises at least one guiding protrusion received in the at least one guide slot.

14. The fixing mechanism of claim 11, wherein the latching member further comprises a blocking end connecting the latching end, the resilient member resists the blocking end, and the blocking end of the latching member and the resilient member are received in the sliding slot.

15. The fixing mechanism of claim 14, wherein the latching end of the latching member comprises a first angled face angled relative to the baseboard, and the resisting member comprises a third angled face facing and matching the first angled face.

16. The fixing mechanism of claim 15, wherein the blocking end comprises a second angled face angled relative to the baseboard, and the control comprises a resisting slope matching the second angled face.

\* \* \* \* \*